United States Patent
Mangsuli et al.

(10) Patent No.: US 10,900,683 B2
(45) Date of Patent: *Jan. 26, 2021

(54) HEATING, VENTILATION, AND AIR CONDITIONING SYSTEM CONTROLLER

(71) Applicant: Honeywell International Inc., Morris Plains, NJ (US)

(72) Inventors: Purnaprajna R. Mangsuli, Bangalore (IN); Ranganathan Srinivasan, Bangalore (IN); Paul Wacker, Plymouth, MN (US); Ondrej Holub, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 267 days.

This patent is subject to a terminal disclaimer.

(21) Appl. No.: 15/924,924

(22) Filed: Mar. 19, 2018

(65) Prior Publication Data

US 2018/0209676 A1    Jul. 26, 2018

Related U.S. Application Data

(63) Continuation of application No. 14/571,570, filed on Dec. 16, 2014, now Pat. No. 9,945,572.

(51) Int. Cl.
*F24F 11/30*     (2018.01)
*G05B 13/02*     (2006.01)
(Continued)

(52) U.S. Cl.
CPC ............. *F24F 11/30* (2018.01); *F24F 11/62* (2018.01); *G05B 13/021* (2013.01); *F24F 11/46* (2018.01);
(Continued)

(58) Field of Classification Search
CPC ...... F24F 2011/0075; F24F 2011/0094; G05B 13/021; G05B 2219/2614
See application file for complete search history.

(56) References Cited

U.S. PATENT DOCUMENTS 5,537,310 A * 7/1996 Tanake ................. G05B 13/042
    700/31
7,949,416 B2    5/2011 Fuller
(Continued)

OTHER PUBLICATIONS

Ma, et al. "Model Predictive Control for the Operation of building Cooling Systems," IEEE Transactions on Control Systems Technology, vol. 20, No. 3, May 2012, pp. 796-803.

*Primary Examiner* — Chad G Erdman
(74) *Attorney, Agent, or Firm* — Seager Tufte & Wickhem LLP

(57) ABSTRACT

Heating, ventilation, and air conditioning (HVAC) controllers are described herein. One method includes receiving an approximate relationship between each of a number of controlled and manipulated variables of an HVAC system, designating one of the number of controlled variables as a primary controlled variable, determining operating parameters for each of the number of manipulated variables that maintain the primary controlled variable based, at least in part, on the approximate relationship between the primary controlled variable and each respective manipulated variable, and determining operating parameters for each of the number of manipulated variables that maintain each of the other controlled variables based, at least in part, on the approximate relationship between each respective other controlled variable and each respective manipulated variable and the determined operating parameters for each of the number of manipulated variables that maintain the primary controlled variable.

20 Claims, 4 Drawing Sheets

(51) Int. Cl.
  *F24F 11/62* (2018.01)
  *F24F 11/46* (2018.01)
  *F24F 11/47* (2018.01)

(52) U.S. Cl.
  CPC ....... *F24F 11/47* (2018.01); *G05B 2219/2614* (2013.01)

(56) References Cited

U.S. PATENT DOCUMENTS

| | | |
|---|---|---|
| 8,200,346 B2 | 6/2012 | Thiele |
| 2006/0021362 A1* | 2/2006 | Sadegh ................ F25B 49/005 62/129 |
| 2008/0231437 A1* | 9/2008 | Singhal ............... G05B 19/042 340/514 |
| 2011/0276180 A1* | 11/2011 | Seem .................... F25B 49/027 700/275 |
| 2012/0039503 A1* | 2/2012 | Chen ....................... G06T 19/00 382/100 |
| 2013/0013120 A1 | 1/2013 | Sabripour |
| 2013/0186119 A1* | 7/2013 | Burns ....................... F25B 1/00 62/115 |
| 2014/0222241 A1* | 8/2014 | Ols ........................ G05B 15/02 700/299 |
| 2015/0205269 A1* | 7/2015 | Venugopal ........... G05B 13/048 700/67 |

\* cited by examiner

HEATING, VENTILATION, AND AIR CONDITIONING SYSTEM CONTROLLER

PRIORITY INFORMATION

This application is a Continuation of U.S. application Ser. No. 14/571,570, filed Dec. 16, 2014, the contents of which are incorporated herein by reference.

TECHNICAL FIELD

The present disclosure relates to heating, ventilation, and air conditioning system controllers.

BACKGROUND

A heating, ventilation, and air conditioning (HVAC) system can be used to control the environment of a building. For example, an HVAC system can be used to control the air temperature, humidity, and/or air quality of a building.

A control system (e.g., controller) can be used to control an HVAC system of a building. For example, the control system (e.g., an operator of the control system) may attempt to set the operating parameters of the manipulated (e.g., input) variables of the HVAC system (e.g., fan speed, compressor speed, etc.) such that the controlled (e.g., output) variables of the HVAC system (e.g., air temperature, humidity, air quality, power consumption, etc.), and therefore the environment of the building, are maintained at a particular (e.g., desired) set point and/or within a particular comfort range. However, because the HVAC system may include multiple manipulated variables, whose operating parameters may affect multiple controlled variables, it may be difficult, time consuming, and/or computationally complex to determine the operating parameters that will maintain the environment of the building at the desired set point and/or within the desired comfort range.

DETAILED DESCRIPTION

Figure 1:
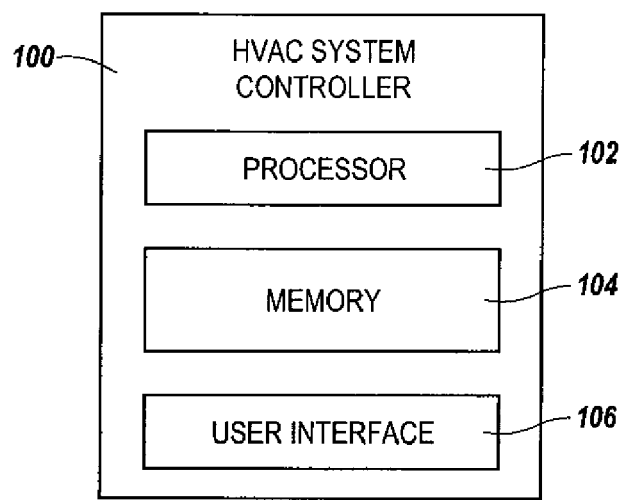
FIG. 1 illustrates an HVAC system controller in accordance with one or more embodiments of the present disclosure.

Heating, ventilation, and air conditioning (HVAC) system controllers are described herein. For example, one or more embodiments include receiving an approximate relationship between each of a number of controlled and manipulated variables of an HVAC system, designating one of the number of controlled variables as a primary controlled variable, determining operating parameters for each of the number of manipulated variables that maintain the primary controlled variable based, at least in part, on the approximate relationship between the primary controlled variable and each respective manipulated variable, and determining operating parameters for each of the number of manipulated variables that maintain each of the other controlled variables based, at least in part, on the approximate relationship between each respective other controlled variable and each respective manipulated variable and the determined operating parameters for each of the number of manipulated variables that maintain the primary controlled variable.

HVAC system controllers in accordance with the present disclosure can determine operating parameters for an HVAC system (e.g., for the manipulated variables of the HVAC system) that will maintain the HVAC system (e.g., the controlled variables of the HVAC system) at a particular (e.g., desired) set point and/or a particular comfort range in an easier, quicker, and/or less computationally complex manner than previous HVAC system controllers. For example, HVAC system controllers in accordance with the present disclosure can be generic, multivariable controllers that can determine the operating parameters for multiple manipulated variables of the HVAC system that maintain multiple controlled variables of the HVAC system at a desired set point and/or within a desired comfort range in an easier, quicker, and/or less computationally complex manner than previous HVAC system controllers.

For instance, HVAC system controllers in accordance with the present disclosure can determine the operating parameters without having to take into account system dynamics (e.g., time-varying) and disturbances associated with (e.g., acting on) the HVAC system, such as outside air temperature, people movement within the building, number of people in the building, occupancy hours of the building, and the fractional load on the HVAC system, among other dynamic disturbances. Further, HVAC system controllers in accordance with the present disclosure can determine the operating parameters without generating or using a model (e.g., the controller can be a non-model based controller). Further, an operator (e.g., field engineer or technician) of HVAC system controllers in accordance with the present disclosure may not need a high level of skill or knowledge of the HVAC system in order to use the controller to determine the operating parameters. Further, HVAC system controllers in accordance with the present disclosure can have a low computational footprint, and can be applicable to and easily embedded within a wide range of currently existing HVAC systems.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of variables" can refer to one or more variables.

FIG. 1 illustrates a heating, ventilation, and air conditioning (HVAC) system controller 100 in accordance with one or more embodiments of the present disclosure. Controller 100 can be used by an operator (e.g., field engineer or technician) to control, for example, the HVAC system of a building. That is, controller 100 can be used by the operator to control the environment of the building.

The HVAC system may include a number of components whose operating parameters can be controlled by controller 100. For example, the HVAC system may include objects, control components, equipment, devices, networks, sensors, and/or actuators such as, for instance, valves such as a heating and/or cooling valves, chillers (e.g., chiller plant), boilers (e.g., boiler plant), pumps such as hot water and/or chilled water pumps, fans, compressors, air dampers such as a variable air volume (VAV) damper, air handling units (AHUs) (e.g., AHU plant), coils such as a heating and/or cooling coil, air filters, and/or cooling towers, among other components. The HVAC system may also include connections (e.g., physical connections) between the components, such as a chain of equipment (e.g., duct work, pipes, ventilation, and/or electrical and/or gas distribution equipment) that connects the components, among other connections. Further, the HVAC system may include (e.g., be divided into) a number of zones, which can correspond to different zones (e.g., rooms, areas, spaces, and/or floors) of the building.

The HVAC system may have a number of manipulated (e.g., input) variables and a number of controlled (e.g., output) variables associated therewith. The controlled variables can be the variables of the HVAC system that the operator of controller 100 is attempting to control (e.g., set and/or change), and can correspond to the environmental conditions of the building. For example, the controlled variables can include the air temperature (e.g., ambient and discharge air temperature), relative humidity, indoor air quality, carbon dioxide level, and/or power consumption of the HVAC system (e.g., of the zones of the HVAC system). The manipulated variables can be the operating parameters for the components of the HVAC system being controlled by controller 100, which can control the controlled variables of the HVAC system. For example, a typical HVAC system might include manipulated variables like the speed of the fans and/or compressors and/or damper position of the economizer and/or coolant or heating valve position, etc., of the HVAC system. That is, controller 100 can be used to control the manipulated variables of the HVAC system, which in turn can control the output variables of the HVAC system. For instance, controller 100 can determine operating parameters for the manipulated variables that will maintain the controlled variables at a particular (e.g., target) set point and/or within a particular comfort range, as will be further described herein.

As shown in FIG. 1, controller 100 can include a memory 104 and a processor 102. Memory 104 can be any type of storage medium that can be accessed by processor 102 to perform various examples of the present disclosure. For example, memory 104 can be a non-transitory computer readable medium having computer readable instructions (e.g., computer program instructions) stored thereon that are executable by processor 102 to determine operating parameters for the manipulated variables of an HVAC system in accordance with the present disclosure. That is, processor 102 can execute the executable instructions stored in memory 104 to determine operating parameters for the manipulated variables of an HVAC system in accordance with the present disclosure.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 104 is illustrated as being located in controller 100, embodiments of the present disclosure are not so limited. For example, memory 104 can also be located internal to another computing resource (e.g., enabling computer readable instructions to be downloaded over the Internet or another wired or wireless connection).

As shown in FIG. 1, controller 100 includes a user interface 106. A user (e.g., operator) of controller 100, such as, for instance, a field engineer or technician for the HVAC system controlled by controller 100, can interact with controller 100 via user interface 106. For example, user interface 106 can provide (e.g., display and/or present) information to the user of controller 100, and/or receive information from (e.g., input by) the user of controller 100. For instance, in some embodiments, user interface 106 can be a graphical user interface (GUI) that can include a display (e.g., a screen) that can provide and/or receive information to and/or from the user of controller 100. The display can be, for instance, a touch-screen (e.g., the GUI can include touch-screen capabilities). As an additional example, user interface 106 can include a keyboard and/or mouse the user can use to input information into controller 100.

Embodiments of the present disclosure, however, are not limited to a particular type(s) of user interface.

Figure 2:
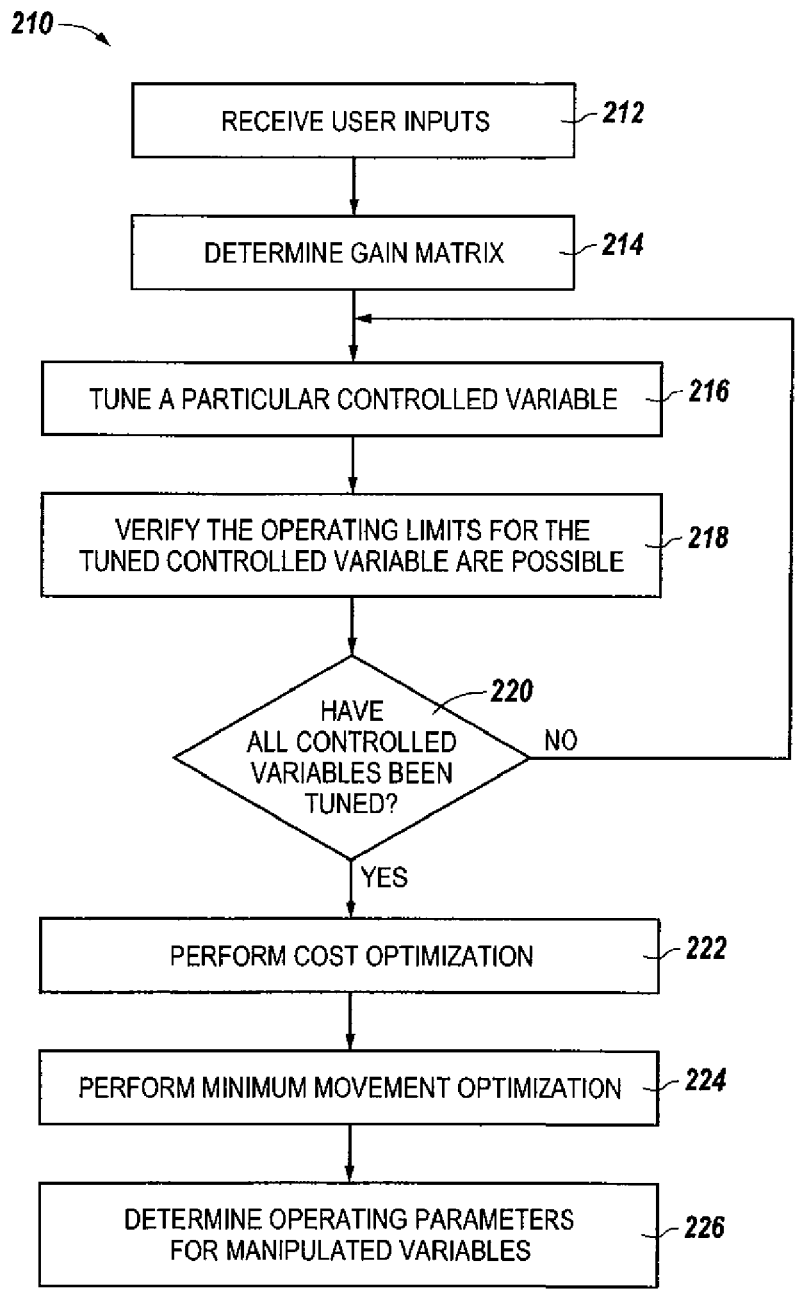
FIG. 2 illustrates a method for controlling an HVAC system in accordance with one or more embodiments of the present disclosure.

FIG. 2 illustrates a method 210 for controlling an HVAC system in accordance with one or more embodiments of the present disclosure. The HVAC system can be, for example, the HVAC system previously described in connection with FIG. 1, and method 210 can be performed by, for example, HVAC system controller 100 previously described in connection with FIG. 1. Method 210 can be used to determine operating parameters for the HVAC system (e.g., for the manipulated variables of the HVAC system).

At block 212, method 210 includes receiving user inputs. In some embodiments, the user inputs can be received from the user of the controller via the user interface of the controller. In some embodiments, the inputs can be programmed into the controller through a graphical or text-based programming tool.

The received inputs can include, for example, an indication of whether there is a positive or negative relationship (e.g., correlation) between each of a number of controlled variables of the HVAC system and each of a number of manipulated variables of the HVAC system. There may be a positive relationship between a controlled variable and a manipulated variable if an increase in the manipulated variable results in an increase controlled variable, or if a decrease in the manipulated variable results in a decrease in the controlled variable. There may be a negative relationship between a controlled variable and a manipulated variable if an increase in the manipulated variable results in a decrease controlled variable, or if a decrease in the manipulated variable results in an increase in the controlled variable.

The received indication of whether there is a positive or negative relationship between a controlled variable and a manipulated variable may not represent the exact or true mathematical relationship between the controlled variable and the manipulated variable. That is, the user does not need to know the exact or true mathematical relationship between the controlled variable and the manipulated variable, and hence may not need a high level of skill or knowledge of the HVAC system. Rather, the received indication may be an indication of an approximate relationship between the controlled variable and the manipulated variable. The relationship may be based on the user's experience and/or knowledge of the HVAC system, and/or the relationship may be based on archived data associated with the HVAC system.

As an example, there can be two controlled variables (e.g., the air temperature and the relative humidity of a zone of the HVAC system) and two manipulated variables (e.g., the speed of a fan and compressor associated with the zone) for which the indication relationship are received. That is, in such an example, the inputs would include an indication of whether there is a positive or negative relationship between a first controlled variable of the HVAC system and a first manipulated variable of the HVAC system, an indication of whether there is a positive or negative relationship between the first controlled variable and a second manipulated variable of the HVAC system, an indication of whether there is a positive or negative relationship between a second controlled variable of the HVAC system and the first manipulated variable, and an indication of whether there is a positive or negative relationship between the second controlled variable and the second manipulated variable. For instance, the user may indicate there is a negative relationship between the air temperature and the fan speed, a negative relationship between the air temperature and the compressor speed, and a negative relationship between the relative humidity and the compressor speed, and the user may indicate there is a positive relationship between the relative humidity and the fan speed. Embodiments of the present disclosure, however, are not limited to a particular number or type of controlled or manipulated variables.

The received inputs can further include a response factor for the controlled variables. The response factor can be an indication from the user as to how fast the controller should determine the operating parameters for the HVAC system (e.g., the amount of time the controller should take to determine the operating parameters for the HVAC system). That is, the user can set the speed at which the controller determines the operating parameters for the HVAC system using the response factor.

The received inputs can further include operating limits for each of the controlled variables and each of the manipulated variables. The operating limit for a controlled or manipulated variable can be, for example, a particular (e.g., target) set point for the variable, or an operating range (e.g., a minimum and maximum operating level) for the variable. For instance, in the example referred to above, the operating limit for the air temperature may be a set point of 72 degrees, the operating limit for the relative humidity may be between 40 and 50%, the operating limit for the fan speed may be between 50 and 100% of the maximum fan speed, and the operating limit for the compressor speed may be between 25 and 100% of the maximum compressor speed. In some embodiments, the operating limits can be determined as feasible limits for the variables based solely on the gain matrix further described herein.

The received inputs can further include a priority level for each of the controlled variables. The priority levels may indicate which controlled variable(s) is the most important controlled variable(s) to be controlled for the HVAC system. For example, a priority level of high may indicate that the controlled variable(s) so designated is the most important controlled variable, while a priority level of low may indicate that the controlled variable(s) so designated is not as important as the other controlled variable(s). For instance, in the example referred to above, the priority level the air temperature may be high, while the priority level of the relative humidity may be low. That is, it may be more important to control the air temperature than the relative humidity in this example.

At block 214, method 210 includes determining a gain matrix based, at least in part, on whether there is a positive or negative relationship between each respective controlled variable and each respective manipulated variable. Each respective element (e.g., entry) in the gain matrix can correspond to (e.g., represent) each respective relationship between the controlled and manipulated variables.

For instance, in the example referred to above, the gain matrix may be a two by two matrix, with the first element corresponding to the relationship between the air temperature and the fan speed, the second element corresponding to the relationship between the air temperature and the compressor speed, the third element corresponding to the relationship between the relative humidity and the fan speed, and the fourth element corresponding to the relationship between the relative humidity and the compressor speed. That is, the gain matrix G may given by:

$$G = \begin{bmatrix} -1 & -1 \\ 1 & -1 \end{bmatrix}$$

That is, $$\begin{bmatrix} y_1 \\ y_2 \end{bmatrix} = G \begin{bmatrix} u_1 \\ u_2 \end{bmatrix}$$

where y1 is the air temperature, y2 is the relative humidity, u1 is the fan speed, and u2 is the compressor speed.

At block 216, method 210 includes tuning a particular controlled variable based, at least in part, on the received inputs (e.g., whether there is a positive or negative relationship between that controlled variable and each respective manipulated variable, the response factor, the operating limits for that controlled variable and the manipulated variables, and the priority level for that controlled variable). The tuning can be done internally by the controller (e.g., without exposing the tuning process to the user of the controller).

As an example, tuning a particular controlled variable y can include defining the bounds dy min and dy max for the controlled variable as:

$$dy_{min} = (k_1 \cdot de_{min} + k_2 \cdot e_{min})/SF$$

$$dy_{max} = (k_1 \cdot de_{max} + k_2 \cdot e_{max})/SF$$

where:

$$u = k_1 e + k_2 \int e$$

$$du = k_1 de + k_2 e$$

$$dy = Gdu = G(k_1 de + k_2 e)$$

and:

$$dy = (k_1 \cdot de + k_2 \cdot e)/SF$$

$$e_{min} = y_{min} - y$$

$$e_{max} = y_{max} - y$$

where G is the gain matrix, k1 is the gain tuning factor for that controlled variable, k2 is the integral tuning factor for that controlled variable, and SF is the scale factor for that controlled variable.

Gain tuning factor k1 and integral tuning factor k2 can be obtained from standard PI tuning rules. Gain tuning factor k1 can be a default high value, while integral tuning factor k2 can be obtained from a look up table of k2 values to make the response time of the controller faster or slower. That is, integral tuning factor k2 can be the primary tuning factor that speeds up the response in the controller determining the operating parameters for the HVAC system, with higher k2 values making the response faster. Scale factor SF will be further described in connection with block 218 of method 210.

At block 218, method 210 includes verifying (e.g., ensuring) that the received operating limits for the tuned controlled variable are possible (e.g., feasible) for the HVAC system by solving a feasibility optimization problem. A typical feasibility optimization problem using positive and negative relationship can be described as follows.

The objective function is given by:

$$\min_{s^+, s^-} \left( \sum \{w_i(s^+ + s^-)\} \right)$$

where $w_i$ is a weight for each controlled variable, and $s^-$ and $s^+$ are slack variables. The constraints can be written as:

subject to:

$$0 \leq s^- < \infty$$

$$0 \leq s^+ < \infty$$

$$(dy_{min})_k \leq dy_k + s^- - s^+ \leq (dy_{max})_k$$

$$(u_{k-1} - u_{min}) \leq du_k \leq (u_{max} - u_{k-1})$$

$$-dy_k + Gdu_k = 0$$

where $$(dy_{min})_k = (k_1((e_{min})_k - (e_{min})_{k-1}) + k_2(e_{min})_k)/S_f$$

$$(dy_{max})_k = (k_1((e_{max})_k - (e_{max})_{k-1}) + k_2(e_{max})_k)/S_f$$

$$(e_{min})_k = y_k - (y_{min})_k$$

$$(e_{max})_k = (y_{max})_k - y_k$$

The gain matrix G can be derived from the positive and negative relationship, and SF is the scale factor, which can be tuned internally or specified by the user.

As previously described, the response factor RF can be used to inflate or deflate the scale factor SF to make the response faster or slower in the following way:

$$(s_F)_m = S_f / RF$$

$$dy = (k_1 \cdot de + k_2 \cdot e)/(s_f)_m$$

$$e_{min} = y_{min} - y$$

$$e_{max} = y_{max} - y$$

$$dy_{min} = (k_1 \cdot de_{min} + k_2 \cdot e)/(s_f)_m$$

$$dy_{max} = (k_1 \cdot de_{max} + k_2 \cdot e)/(s_f)$$

At block 220, method 210 includes determining whether all of the controlled variables have been tuned. If all of the controlled variables have been tuned, method 210 proceeds to block 222. If not all of the controlled variables have been tuned, method 210 returns to block 216. That is, blocks 216 and 218 are repeated for each respective controlled variable, until all the controlled variables have been tuned.

At block 222, method 210 includes performing a cost optimization on the tuned controlled variables. The cost optimization can include determining operating parameters needed to place (e.g., keep) each respective tuned controlled variable within its respective operating limit at the lowest possible economic cost based on the gain matrix alone. The lowest possible economic cost can be determined by solving the following cost optimization problem:

The objective function is $$\min_z z$$

subject to:

$$-\infty \leq z \leq \infty$$

$$(dy^*_{min})_k \leq dy_k \leq (dy^*_{max})_k$$

$$(dy^*_{min})_k = (dy_{min})_k - \hat{S}^- (dy^*_{max})_k = (dy_{max})_k + \hat{S}^+$$

$$(\Sigma(\alpha \cdot du_k + \beta \cdot dy_k) - z) = 0$$

$$-dy_k + Gdu_k = 0$$

$\hat{S}^+, \hat{S}^-$ solutions from previous step

The gain matrix G is derived from positive and negative relationship.

At block 224, method 210 includes performing a minimum movement optimization on the tuned controlled variables. The minimum movement optimization can include determining operating parameters needed to place (e.g., keep) each respective tuned controlled variable within its respective operating limit with the lowest possible amount of change in the operating parameters based on the gain matrix information alone. The minimum movement problem is the solution to the following optimization problem:

The objective function is $$\min_{du_k} \left( \sum w_{1_i} (du_k)^2 \right)$$

subject to:

$$(dy_{min})_k \leq dy_k \leq (dy_{max})_k$$

$$(u_{k-1} - u_{min}) \leq du_k \leq (u_{max} - u_{k-1})$$

$$\Sigma(\alpha \cdot du_k + \beta \cdot dy_k) \leq z^*$$

z* optimal solutions from previous step $$-dy_k + Gdu_k = 0$$

The gain matrix G is derived from positive and negative relationship.

At block 226, method 210 includes determining (e.g., calculating) operating parameters for each of the manipulated variables of the HVAC system. The operating parameters for the manipulated variables can be determined based, at least in part, on the tuning of the controlled variables. That is, the operating parameters for the manipulated variables can be determined based, at least in part, on the received inputs (e.g. whether there is a positive or negative relationship between each respective controlled variable and each respective manipulated variable, the response factor, the operating limits for each respective controlled variable and manipulated variable, and the priority level for each respective controlled variable) and the gain matrix. Further, the operating parameters for the manipulated variables can be determined based on the cost optimization and the minimum movement optimization performed on the tuned controlled variables. The determined operating parameters for the manipulated variables may maintain the controlled variables at a pre-determined (e.g., target) set point and/or within a pre-determined (e.g., target) comfort range such as, for instance, the set-point and/or operating range received with the operating limits.

The determined operating parameters for the manipulated variables, however, may not be based on system dynamics (e.g., time-varying) and disturbances associated with (e.g., acting on) the HVAC system, such as outside air temperature, people movement within the building, number of people in the building, occupancy hours of the building, and the fractional load on the HVAC system, among other disturbances. Further, the operating parameters for the manipulated variables may be determined without generating or using a model (e.g., method 210 can be a non-model based method). As such, the operating parameters for the manipulated variables may be determined in an easier, quicker, and/or less computationally complex manner than in previous approaches.

Figure 3:
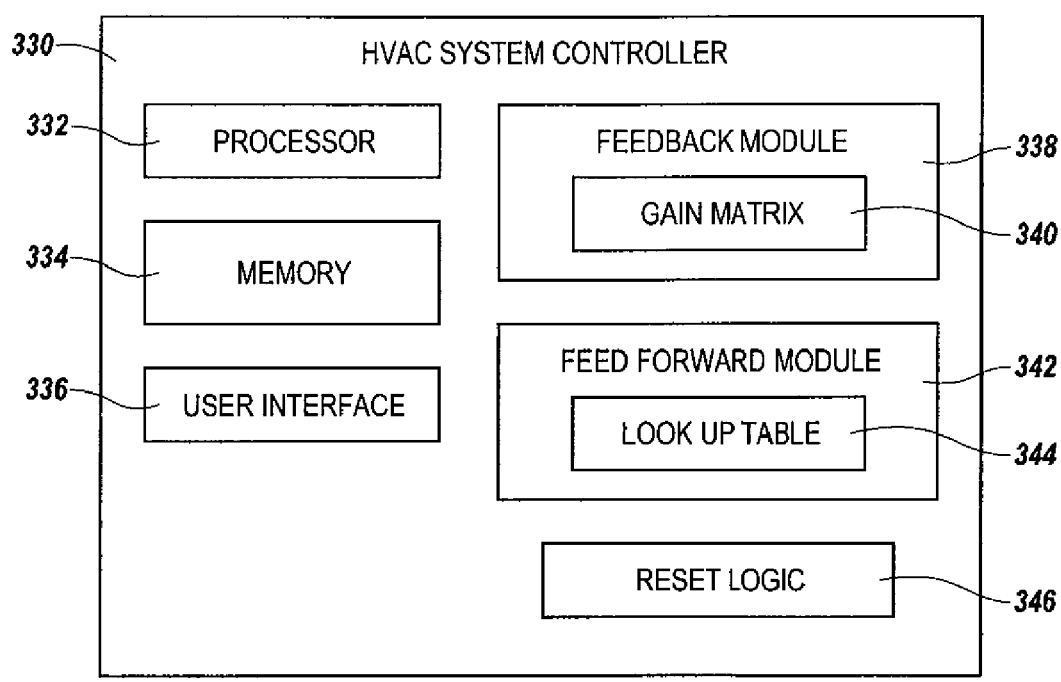
FIG. 3 illustrates an HVAC system controller in accordance with one or more embodiments of the present disclosure.

FIG. 3 illustrates a heating, ventilation, and air conditioning (HVAC) system controller 330 in accordance with one or more embodiments of the present disclosure. Controller 330 can be used by an operator (e.g., field engineer or technician) to control, for example, the HVAC system of a building. That is, controller 330 can be used by the operator to control the environment of the building.

The HVAC system may be analogous to the HVAC system previously described herein (e.g., in connection with FIG. 1). For example, the HVAC system may include a number of components whose operating parameters can be controlled by controller 330, in a manner analogous to that previously described herein. Further, the HVAC system may have a number of manipulated (e.g., input) variables and a number of controlled (e.g., output) variables associated therewith, in a manner analogous to that previously described herein.

As shown in FIG. 3, controller 330 can include a memory 334, a processor 332, and a user interface 336. Memory 334, processor 332, and user interface 336 can be analogous to memory 104, processor 102, and user interface 106, respectively, previously described in connection with FIG. 1.

As shown in FIG. 3, controller 330 can include a feedback module 338, a feed forward module 342, and reset logic 346. Feedback module 338 can include gain matrix 340, and feed forward module 342 can include look up table 344, as illustrated in FIG. 3. Feedback module 338 (e.g., gain matrix 340), feed forward module 342 (e.g., look up table 344), and reset logic 346 will be further described herein (e.g., in connection with FIG. 4).

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Figure 4:
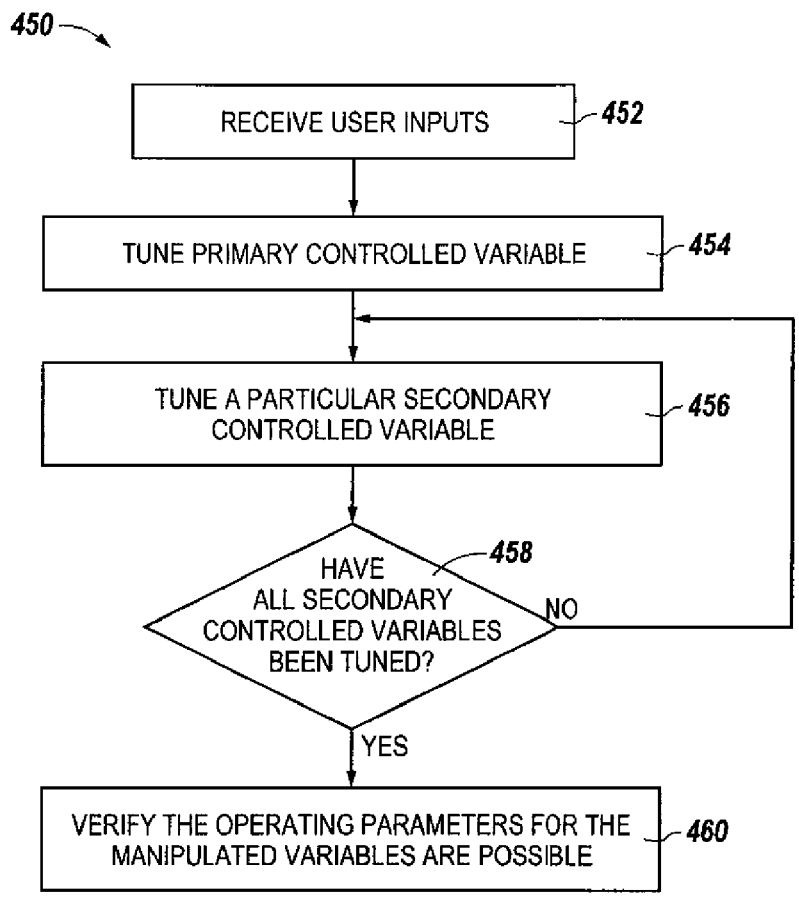
FIG. 4 illustrates a method for controlling an HVAC system in accordance with one or more embodiments of the present disclosure.

FIG. 4 illustrates a method 450 for controlling an HVAC system in accordance with one or more embodiments of the present disclosure. The HVAC system can be, for example, the HVAC system previously described in connection with FIG. 3, and method 450 can be performed by, for example, HVAC system controller 330 previously described in connection with FIG. 3. Method 450 can be used to determine operating parameters for the HVAC system (e.g., for the manipulated variables of the HVAC system).

At block 452, method 450 includes receiving user inputs. In some embodiments, the user inputs can be received from the user of the controller via the user interface of the controller. In some embodiments, the inputs can be programmed into the controller through a graphical or text-based programming tool.

The received inputs can include, for example, an approximate relationship (e.g., correlation) between each of a number of controlled variables of the HVAC system and each of a number of manipulated variables of the HVAC system. That is, the received relationships may not represent the exact or true mathematical relationships between each respective controlled variable and each respective manipulated variable. For instance, the user does not need to know the exact or true mathematical relationship between each respective controlled variable and each respective manipulated variable, and hence may not need a high level of skill or knowledge of the HVAC system. The relationship may be based on the user's experience and/or knowledge of the HVAC system, and/or the relationship may be based on archived data associated with the HVAC system.

The approximate relationship between a controlled variable of the HVAC system and a manipulated variable of the HVAC system may include an approximation of how much and/or how quickly the manipulated variable (e.g., the operating parameters of the manipulated variable) affects (e.g., controls) the controlled variable, and may be represented as a numerical value. For example, the approximate relationship between a controlled variable and a manipulated variable may be an order of magnitude approximation of how much and/or how quickly the manipulated variable affects the controlled variable.

As an example, there can be two controlled variables (e.g., the air temperature and the relative humidity of a zone of the HVAC system) and two manipulated variables (e.g., the speed of a fan and compressor associated with the zone) for which the indication relationship are received. That is, in such an example, the inputs would include an approximate relationship between a first controlled variable of the HVAC system and a first manipulated variable of the HVAC system, an approximate relationship between the first controlled variable and a second manipulated variable of the HVAC system, an approximate relationship between a second controlled variable of the HVAC system and the first manipulated variable, and an approximate relationship between the second controlled variable and the second manipulated variable. Embodiments of the present disclosure, however, are not limited to a particular number or type of controlled or manipulated variables.

The received inputs can further include a designation of one of the controlled variables of the HVAC system as a primary controlled variable, and a designation of the other controlled variables as secondary controlled variables. The designation of a controlled variable as the primary controlled variable can indicate that that controlled variable has a higher priority level (e.g., is more important to control) in the HVAC system than the controlled variables designated as the secondary controlled variables. For instance, in the example referred to above, the air temperature may be designated as the primary controlled variable, while the relative humidity may be designated as the secondary controlled variable. That is, it may be more important to control the air temperature than the relative humidity in this example.

The received inputs can further include a confidence level for each respective approximate relationship. That is, the inputs can include a confidence level for the approximate relationship between the primary controlled variable and each respective manipulated variable, and a confidence level for the approximate relationship between each respective controlled variable and each respective manipulated variable. The confidence level for an approximate relationship can be an indication of the accuracy and/or reliability of that relationship (e.g., an indication of how confident the user is in the accuracy and/or reliability of the approximate relationship).

The received inputs can further include a particular (e.g., target) set point or a particular (e.g., target) range (e.g., comfort range) for each respective controlled variable of the HVAC system. That is, the inputs can include a target set point or range for the primary controlled variable, and a target set point or range for each respective secondary controlled variable. For instance, in the example referred to above, the inputs may include a target set point for the air temperature and a target range for the relative humidity.

The received inputs can further include operating conditions (e.g., disturbances) for the HVAC system such as, for instance, outside air temperature, people movement within the building, number of people in the building, and/or occupancy hours of the building. Further, the received inputs can include a time constant (e.g., an estimate of a dominant time constant, an approximation of a transport delay by the time constant) for each approximate relationship. That is, the inputs can include a time constant for the approximate relationship between the primary controlled variable and each respective manipulated variable, and a time constant for the approximate relationship between each respective controlled variable and each respective manipulated variable.

The received inputs can further include a response factor for the controlled variables. The response factor can be analogous to the response factor previously described in connection with FIG. 2.

At block 454, method 450 includes tuning the primary controlled variable to determine (e.g., calculate) operating parameters for each of the manipulated variables of the HVAC system that will maintain the primary controlled variable at its particular (e.g., target) set point or within its particular (e.g., target) range. The tuning (e.g., the determination of the operating parameters) can be based, at least in part, on the received inputs (e.g., the approximate relationship between the primary controlled variable and each respective manipulated variable, the confidence level and/or time constant for each of those approximate relationships, the target set point or range for the primary controlled variable, and/or the operating conditions for the HVAC system).

The tuning (e.g., the determination of the operating parameters) can be done internally by the controller (e.g., without exposing the tuning process to the user of the controller). Further, the operating parameters for the manipulated variables may be determined without generating or using a model (e.g., method 450 can be a non-model based method). As such, the operating parameters for the manipulated variables may be determined in an easier, quicker, and/or less computationally complex manner than in previous approaches.

Tuning the primary controlled variable can include, for example, determining a gain matrix (e.g., gain matrix 340 illustrated in FIG. 3) based, at least in part, on the approximate relationship between the primary controlled variable and each respective manipulated variable, and determining the operating parameters for each of the manipulated variables that maintain the primary controlled variable at its target set point or within its target range based on the gain matrix. Each respective element (e.g., entry) in the gain matrix can correspond to (e.g., represent) each respective approximate relationship between the primary controlled variable and the manipulated variables. For instance, in the example referred to above, the gain matrix may include an element corresponding to the approximate relationship between the air temperature and the fan speed, and an element corresponding to the approximate relationship between the air temperature and the compressor speed. The gain matrix can be determined and/or stored by feedback module 338 illustrated in FIG. 3.

Further, the tuning can be done using a look up table (e.g., look up table 344 illustrated in FIG. 3) that includes operating parameters for each of the manipulated variables that will maintain the primary controlled variable at the target set point or within the target range for different operating conditions (e.g., disturbances) for the HVAC system. For example, the operating parameters for each of the manipulated variables that maintain the primary controlled variable at its target set point or within its target range can be looked up in and/or selected from the operating parameters included in the look up table. The look up table can be included (e.g., stored) in feed forward module 342 illustrated in FIG. 3.

The look up table (e.g., the operating parameter values in the table) can be determined based, at least in part, on the approximate relationship between each respective controlled variable and each respective manipulated variable, and on the operating conditions for the HVAC system. That is, the approximate relationships can be used to calculate the look up table. Further, an uncertainty for the look up table (e.g., for the operating parameter values in the table) can be determined based, at least in part, on the range of and/or confidence level for the approximate relationship between the primary controlled variable and each respective manipulated variable, and the operating parameters for each of the manipulated variables that maintain the primary controlled variable at its target set point or within its target range can be determined based, at least in part, on the determined uncertainty.

The look up table (e.g., the operating parameter values in the table) and/or the gain matrix can be reset to a default value upon the primary controlled variable and/or one of the manipulated variables meeting or exceeding a pre-defined threshold. The default value can be based on, for example, previous set points and/or comfort ranges, previous controlled and/or manipulated variables, and/or previous operating conditions (e.g., disturbances) of the HVAC system. The reset can be performed by reset logic 346 illustrated in FIG. 3.

As an example tuning of a primary controlled variable, a primary controlled variable with the assumed structure of gain and two time constants can be given by:

$$G(s) = \frac{G_0}{(\tau s + 1)^2}$$

This can be rearranged as:

$$G(s) = \frac{g_1}{(s + \omega_f)^2} = \frac{g_0(\omega_0^2 + \omega_f^2)}{(s + \omega_f)^2}$$

for which:

$$|G(j\omega_0)| = g_0$$

where g0 and ω0 are slow gain parameters, which can be static or estimated from measured data, and ωf is a bandwidth parameter, which can be related to the response time or expected response of the HVAC system. Nominal tuning Pnom and robust tuning P can then be done, where:

$$P_{nom} = \frac{\omega_f^2}{2g_1}$$

and:

$$P = \frac{\omega_f^2}{2kg_1}$$

where k is the confidence level.

At block 456, method 450 includes tuning a particular secondary controlled variable to determine (e.g., calculate) operating parameters for each of the manipulated variables of the HVAC system that will maintain that secondary controlled variable at its particular (e.g., target) set point or within its particular (e.g., target) range. The tuning (e.g., the determination of the operating parameters) can be based, at least in part, on the received inputs (e.g., the approximate relationship between the secondary controlled variable and each respective manipulated variable, the confidence level and/or time constant for each of those approximate relationships, the target set point or range for the secondary controlled variable, and/or the operating conditions for the HVAC system), and on the previously determined operating parameters for each of the manipulated variables that maintain the primary controlled variable at its target set point or within its target range. The tuning can be done internally by the controller and/or without generating or using a model, as previously described herein.

Tuning the particular secondary controlled variable can include, for example, updating (e.g., recalculating) the previously determined gain matrix based, at least in part, on the approximate relationship between the secondary controlled variable and each respective manipulated variable, and on the previously determined operating parameters for each of the manipulated variables that maintain the primary controlled variable at its target set point or within its target range. The operating parameters for each of the manipulated variables that maintain the secondary controlled variable at its target set point or within its target range can then be determined based on the updated gain matrix. Each respective element (e.g., entry) in the updated gain matrix can correspond to (e.g., represent) each respective approximate relationship between the secondary controlled variable and the manipulated variables. For instance, in the example referred to above, the updated gain matrix may include an element corresponding to the approximate relationship between the relative humidity and the fan speed, and an element corresponding to the approximate relationship between the relative humidity and the compressor speed.

Further, the tuning can be done using the look up table, which may also include operating parameters for each of the manipulated variables that will maintain the particular secondary controlled variable at its target set point or within the target range for different operating conditions (e.g., disturbances) for the HVAC system. For example, the operating parameters for each of the manipulated variables that maintain the secondary controlled variable at its target set point or within its target range can be looked up in and/or selected from the operating parameters included in the look up table, in a manner analogous to that described in connection with the primary controlled variable.

The look up table (e.g., the operating parameter values in the table) can be determined based, at least in part, on the approximate relationship between the secondary controlled variable and each respective manipulated variable. That is, the approximate relationships can be used to calculate the look up table. Further, an uncertainty for the look up table (e.g., for the operating parameter values in the table) can be determined based, at least in part, on the range of and/or confidence level for the approximate relationship between the secondary controlled variable and each respective manipulated variable, and the operating parameters for each of the manipulated variables that maintain the secondary controlled variable at its target set point or within its target range can be determined based, at least in part, on the determined uncertainty.

The look up table (e.g., the operating parameter values in the table) and/or the gain matrix can be reset to a default value upon the secondary controlled variable and/or one of the manipulated variables meeting or exceeding a pre-defined threshold, in a manner analogous to that described in connection with the primary controlled variable.

As an example tuning of a secondary controlled variable, with the same assumed structure of gain and two time constants as the primary controlled variable, the apparent gain can be given by:

$$\frac{g'_{21}}{g_{21}} = 1 - \frac{\omega_{f11}}{w_{f11} + \omega_{f12}} \cdot \left(\frac{g_{22}}{g_{21}} - \frac{g_{12}}{g_{11}}\right)$$

and tuning P can be done where:

$$P = \frac{\omega_f^2}{2k'_{g_{21}}}$$

At block 458, method 450 includes determining whether all secondary controlled variables have been tuned. If all secondary controlled variables have been tuned, method 450 proceeds to block 460. If not all secondary controlled variables have been tuned, method 450 returns to block 456. That is, block 456 is repeated for each respective secondary controlled variable, until all the secondary controlled variables have been tuned (e.g., the operating parameters for each of the manipulated variables that maintain each of the secondary controlled variables are determined one secondary controlled variable at a time after the operating parameters that maintain the primary controlled variable have been determined).

At block 460, method 450 includes verifying (e.g., validating) that the determined operating parameters for the manipulated variables that maintain the primary controlled variable and the secondary controlled variable(s) at their respective set points or within their respective ranges are possible (e.g., feasible) for the HVAC system.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller of a heating, ventilation, and air conditioning (HVAC) system, comprising:
   a user interface configured to receive:
      an approximate relationship between each of a number of controlled variables of an HVAC system and each of a number of manipulated variables of the HVAC system, wherein the approximate relationship between each of the number of controlled variables and each of the number of manipulated variables are order of magnitude approximations of the relationship between each respective controlled variable and each respective manipulated variable; and
      a designation of one of the number of controlled variables as a primary controlled variable and the other controlled variables as secondary controlled variables;
   a memory; and
   a processor configured to execute executable instructions stored in the memory to:
      determine operating parameters for each of the number of manipulated variables that maintain the primary controlled variable at a particular set point or within a particular range based, at least in part, on the approximate relationship between the primary controlled variable and each respective manipulated variable; and
      determine operating parameters for each of the number of manipulated variables that maintain each of the secondary controlled variables at a particular set point or within a particular range based, at least in part, on:
         the approximate relationship between each respective secondary controlled variable and each respective manipulated variable; and
         the determined operating parameters for each of the number of manipulated variables that maintain the primary controlled variable;
   wherein the controller is used to control the manipulated variables which in turn control the controlled variables.

2. The controller of claim 1, wherein the processor is configured to execute the instructions to maintain an environment of a building at a particular set point or a particular range based on the determined operating parameters.

3. The controller of claim 1, wherein the approximate relationship between each of the number of controlled variables and each of the number of manipulated variables includes an approximation of how much and how quickly each respective manipulated variable affects each respective controlled variable.

4. The controller of claim 1, wherein the order of magnitude approximations of the relationship between each respective controlled variable and each respective manipulated variable are represented as numerical values.

5. The controller of claim 1, wherein:
   the number of controlled variables comprises two controlled variables; and
   the number of manipulated variables comprises two manipulated variables.

6. The controller of claim 1, wherein:
   the user interface is configured to receive a response factor for the number of controlled variables; and
   the processor is configured to execute the instructions to:
      determine the operating parameters for each of the number of manipulated variables that maintain the primary controlled variable based, at least in part, on the response factor; and
      determine the operating parameters for each of the number of manipulated variables that maintain each of the secondary controlled variables based, at least in part, on the response factor.

7. A method for controlling a heating, ventilation, and air conditioning (HVAC) system, comprising:
   receiving, by a controller of an HVAC system, an approximate relationship between each of a number of controlled variables of the HVAC system and each of a number of manipulated variables of the HVAC system, wherein the approximate relationship between each of the number of controlled variables and each of the number of manipulated variables includes an approximation of how much each respective manipulated variable affects each respective controlled variable;
   designating, by the controller, one of the number of controlled variables as a primary controlled variable;

determining, by the controller, operating parameters for each of the number of manipulated variables that maintain the primary controlled variable at a particular set point or within a particular range based, at least in part, on the approximate relationship between the primary controlled variable and each respective manipulated variable; and determining, by the controller, operating parameters for each of the number of manipulated variables that maintain each of the other controlled variables at a particular set point or within a particular range based, at least in part, on:

the approximate relationship between each respective other controlled variable and each respective manipulated variable; and the determined operating parameters for each of the number of manipulated variables that maintain the primary controlled variable;

controlling, by the controller, the manipulated variables which in turn control the controlled variables.

8. The method of claim 7, wherein the approximate relationship between each of the number of controlled variables and each of the number of manipulated variables includes an approximation of how quickly each respective manipulated variable affects each respective controlled variable.

9. The method of claim 7, wherein the method includes receiving, by the controller, the approximate relationship between each of the number of controlled variables and each of the number of manipulated variables from a user of the controller.

10. The method of claim 7, wherein the method includes determining, by the controller, the approximate relationship between each of the number of controlled variables and each of the number of manipulated variables based on archived data associated with the HVAC system.

11. The method of claim 7, wherein:
the number of controlled variables include
an air temperature of a zone of the HVAC system; and
a relative humidity of the zone;
the number of manipulated variables include:
a speed of a fan associated with the zone; and
a speed of a compressor associated with the zone.

12. The method of claim 11, wherein the air temperature of the zone is designated as the primary controlled variable.

13. The method of claim 7, wherein the method includes receiving, by the controller, the particular set point or particular range for the primary controlled variable and the particular set point or particular range for each of the other controlled variables from a user of the controller.

14. A non-transitory computer readable medium having computer readable instructions stored thereon that are executable by a processor to:

receive an approximate relationship between each of a number of controlled variables of an HVAC system and each of a number of manipulated variables of the HVAC system, wherein the approximate relationship between each of the number of controlled variables and each of the number of manipulated variables includes an approximation of how much and how quickly each respective manipulated variable affects each respective controlled variable;

designate one of the number of controlled variables as a primary controlled variable;

determine operating parameters for each of the number of manipulated variables that maintain the primary controlled variable at a particular set point based, at least in part, on the approximate relationship between the primary controlled variable and each respective manipulated variable; and determine operating parameters for each of the number of manipulated variables that maintain each of the other controlled variables within a particular range based, at least in part, on:

the approximate relationship between each respective other controlled variable and each respective manipulated variable; and the determined operating parameters for each of the number of manipulated variables that maintain the primary controlled variable at the particular set point;

and control the manipulated variables which in turn control the controlled variables.

15. The computer readable medium of claim 14, wherein the instructions are executable by the processor to:
receive an indication of an accuracy of the approximate relationship between each of the number of controlled variables and each of the number of manipulated variables; and determine the operating parameters for each of the number of manipulated variables that maintain the primary controlled variable at the particular set point based, at least in part, on the indication of the accuracy of the approximate relationship between the primary controlled variable and reach respective manipulated variable.

16. The computer readable medium of claim 14, wherein the instructions are executable by the processor to:
receive an indication of a reliability of the approximate relationship between each of the number of controlled variables and each of the number of manipulated variables; and determine the operating parameters for each of the number of manipulated variables that maintain the primary controlled variable at the particular set point based, at least in part, on the indication of the reliability of the approximate relationship between the primary controlled variable and reach respective manipulated variable.

17. The computer readable medium of claim 14, wherein the approximation of how much each respective manipulated variable affects each respective controlled variable is represented as a numerical value.

18. The computer readable medium of claim 14, wherein the approximation of how quickly each respective manipulated variable affects each respective controlled variable is represented as a numerical value.

19. The computer readable medium of claim 14, wherein the instructions are executable by the processor to:
determine the operating parameters for each of the number of manipulated variables that maintain the primary controlled variable based, at least in part, on operating conditions for the HVAC system; and determine the operating parameters for each of the number of manipulated variables that maintain each of the other controlled variables based, at least in part, on the operating conditions for the HVAC system.

20. The computer readable medium of claim 14, wherein the instructions are executable by the processor to:
determine the operating parameters for each of the number of manipulated variables that maintain the primary controlled variable based, at least in part, on a time constant for the approximate relationship between the primary controlled variable and each respective manipulated variable; and determine the operating parameters for each of the number of manipulated variables that maintain each of the other controlled variables based, at least in part, on a time constant for the approximate relationship between each respective other controlled variable and each respective manipulated variable.

* * * * *